United States Patent [19]
Johnson

[11] Patent Number: 5,883,300
[45] Date of Patent: Mar. 16, 1999

[54] SYSTEM AND METHOD FOR CONTAINING FLUID LEAKS AND OVERFLOWS FROM APPLIANCES

[76] Inventor: Addison Johnson, 1346 E. Juniper Beach Rd., Camano Island, Wash. 98292

[21] Appl. No.: 943,797

[22] Filed: Oct. 3, 1997

Related U.S. Application Data

[60] Provisional application No. 60/027,606 Oct. 3, 1996.

[51] Int. Cl.$^6$ .............. F16K 33/00; B60R 5/04; G06B 21/00; F16L 5/00
[52] U.S. Cl. .............. 73/40; 141/198; 137/312; 73/40.5 R
[58] Field of Search ................ 73/40, 40.5 R; 141/198; 137/312

[56] References Cited

U.S. PATENT DOCUMENTS

| | | | |
|---|---|---|---|
| 2,762,736 | 9/1956 | Beuglet | 154/82 |
| 2,769,395 | 11/1956 | Olson, Jr. | 103/12 |
| 2,780,303 | 2/1957 | Yavitch | 182/31 |
| 3,148,698 | 9/1964 | Arnold | 137/360 |
| 3,186,427 | 6/1965 | Martin et al. | 137/343 |
| 3,312,076 | 4/1967 | Clarke et al. | 62/55 |
| 4,069,837 | 1/1978 | Jirasek | 137/360 |
| 4,226,348 | 10/1980 | Dotter et al. | 224/42.42 |
| 4,311,476 | 1/1982 | Williams | 493/176 |
| 4,410,004 | 10/1983 | Kifer et al. | 137/360 |
| 4,716,925 | 1/1988 | Prather | 137/360 |
| 4,925,117 | 5/1990 | Ramos | 244/236 |
| 5,099,873 | 3/1992 | Sanchez | 137/312 |
| 5,265,656 | 11/1993 | McGarvey | 141/198 |
| 5,357,241 | 10/1994 | Welch, Jr. et al. | 340/605 |
| 5,511,573 | 4/1996 | Corte | 137/15 |
| 5,568,817 | 10/1996 | Harty | 128/849 |
| 5,656,999 | 8/1997 | Campbell | 340/605 |

Primary Examiner—Hezron Williams
Assistant Examiner—J. David Wiggins
Attorney, Agent, or Firm—Michael R. Schacht; Hughes & Schacht, P.S.

[57] ABSTRACT

A system and method for containing leaks from appliances. A fluid containment member has a bottom panel and four side panels. At least one of the side panels is movable relative to the bottom panel to allow the fluid containment member to be reconfigured among a plurality of configurations. In one configuration, one of the side walls is made substantially coplanar with the bottom panel to allow an appliance to be placed onto the bottom panel. In a second configuration all four side panels extend at an angle to the bottom panel to define a sump region that is enclosed on five sides. In a third configuration, all four side panels are substantially coplanar with the bottom panel to allow the fluid containment member to be stored in a flat configuration. Indicator means may be provided to indicate the presence of water in the sump region.

18 Claims, 5 Drawing Sheets

SYSTEM AND METHOD FOR CONTAINING FLUID LEAKS AND OVERFLOWS FROM APPLIANCES

RELATED APPLICATIONS

This application claims priority of Provisional Application Ser. No. 60/027,606, filed on Oct. 3, 1996.

TECHNICAL FIELD

The present invention relates to the containment of fluid leaks and overflows and, more particularly, the containment of fluid leaking or overflowing from household appliances such as dishwashers, hot water heaters, washing machines, and refrigerators.

BACKGROUND OF THE INVENTION

Household appliances such as washing machines, dishwashers, refrigerators, garbage disposals, and hot water heaters often contain, circulate, dispense, and otherwise use water while operating. Due to failed gaskets, worn seals, broken or improperly connected hoses, and/or plugged drain pipes, water used by such household appliances can leak or overflow into the floors and walls surrounding the area in which the appliance is located. Such leaks and overflows can cause extensive damage to carpets, furniture, flooring, and personal possessions within the home; slow leaks can be even more serious, resulting in serious structural damage to the home itself.

Often, cabinets and the like are built around at least the base of appliances that use water. For example, a garbage disposal will normally be mounted to the drain of a kitchen sink and will be entirely out of sight within the cabinet. A dishwasher is normally mounted under a kitchen countertop such that only its front face is exposed. A refrigerator will often be abutted on at least one side, and usually on two sides, at its bottom by kitchen cabinets.

In any of these cases, a slow leak will likely be out of sight and may go undetected for a long period of time; such a slow leak can cause water to seep into the cabinets adjacent to the appliance and eventually into the flooring and framing of the house. If this situation persists for a long period of time, the cabinets, flooring, and frame of the house can be extensively damaged.

The need thus exists for a system for preventing slow water leaks in household appliances from damaging wooden components of a house.

OBJECTS OF THE INVENTION

From the foregoing, it should be clear that one object of the present invention is to provide improved systems and methods for containing fluid leaks and overflows from household appliances that use or contain water.

Another more specific object of the invention is to provide fluid containment systems and methods having a favorable mix of the following characteristics:

- inexpensive to manufacture and ship;
- easy and inexpensive to install, either as a retrofit or in new construction;
- does not interfere with the installation of the appliance;
- may be adapted for use under a large number of different types of appliances of different sizes and different installation locations; and
- does not interfere with the operation of the appliance or the cabinets surrounding the appliance.

DETAILED DESCRIPTION

Figure 1:
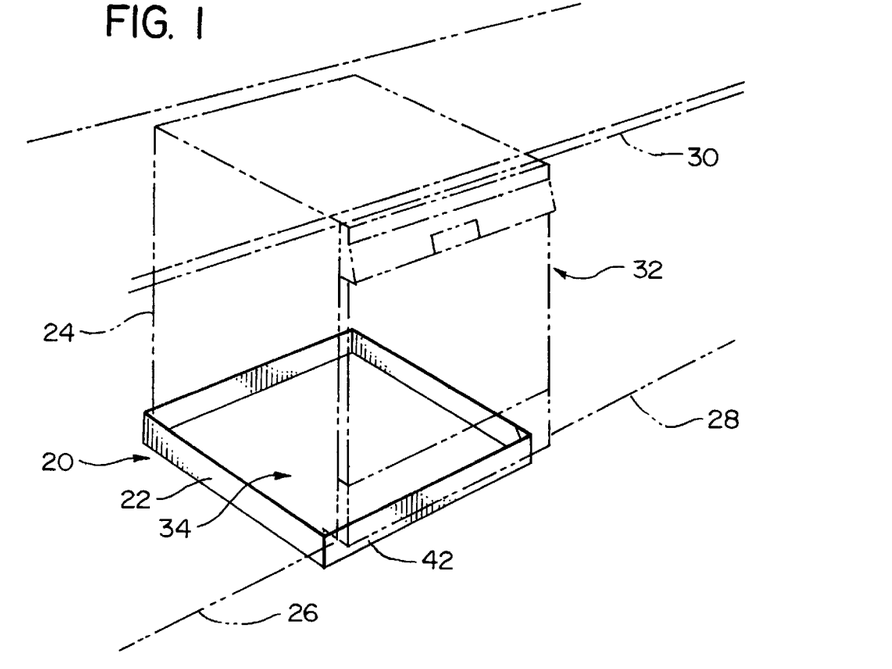
FIG. 1 is a perspective view showing the environment in which the fluid containment system of the present invention is used.

Referring now to the drawing, depicted at 20 in FIG. 1 is a fluid containment system constructed in accordance with, and embodying, the principles of the present invention. This system 20 comprises a containment device 22 adapted to contain leaks, overflows, and the like from a household appliance such as a dishwasher 24.

The present invention will be described in the context of a dishwasher and has particular advantage in that context; but the present invention may be used in connection with other appliances that employ water and/or are connected to water sources. Such appliances include washing machines, hot water heaters, refrigerators, garbage disposals, and air conditioning units. The following discussion is therefore intended to be illustrative only, with the scope of the present invention being defined by the claims attached hereto.

The dishwasher 24 is conventional and will be described herein only to the extent necessary for a complete understanding of the present invention. In particular, dishwashers such as the dishwasher 24 are conventionally connected to hot and cold water sources and use this water in the process of washing dishes loaded therein. A dishwasher is also conventionally provided with a drain hose for removal of the water during and after the washing process.

Washing machines are also conventionally mounted, as shown in FIG. 1, between cabinet sections 26 and 28 and under a countertop 30.

The cabinets 26 and 28 and countertop 20 are conventionally constructed first, and the dishwasher 24 is inserted into an cavity 32 defined by the cabinets 26 and 28 and countertop 30 and sized and dimensioned to accept the dishwasher 24.

Accordingly, the dishwasher 24 is conventionally installed by: placing the dishwasher 24 adjacent to the opening 32; connecting any necessary pre-plumbed hoses to the dishwasher 24; and sliding or rolling the dishwasher into the space 32.

For a variety of reasons, water may escape from the dishwasher 24. For example, the hoses connected to the dishwasher may leak. This usually happens at the point where the hoses are attached to the dishwasher. Additionally, the drain may become plugged such that water does not empty from the dishwasher. Opening the door at this point may allow water to escape from the dishwasher. In some situations, the seal between the door of the dishwasher and the opening through which dishes are loaded can fail, resulting in water leaking from the dishwasher through the seam defined by the door and the dishwasher opening.

In most of these case, water leaking from the dishwasher will run down the side of the dishwasher and onto the floor underneath. In the case of a catastrophic failure, a sizable amount of water will be dumped onto the floor, possibly causing wooden flooring components to warp and similar damage to carpets, linoleum, and the like. A slow leak, such as at a connection between a hose and the dishwasher 24, is less readily apparent but perhaps even more damaging. A slow leak that occurs over a long period of time will seep into the floor and even the frame of the house and create conditions that result in rotting of wooden housing components. The costs of repairing damage caused by slow, minor leaks can be very extensive as they often require repair to the structural frame of the house.

The containment device 22 shown in FIGS. 1–5 is designed to be placed underneath the dishwasher 24. The device 22 is made of a fluid impermeable material such as plastic or the like that does not rot and is not otherwise adversely affected by water. If the dishwasher 24 should leak or overflow as described above, the water will collect in the containment device 22 and will not be allowed to escape where it can do damage to flooring materials and/or the structure of the house.

Figure 2:
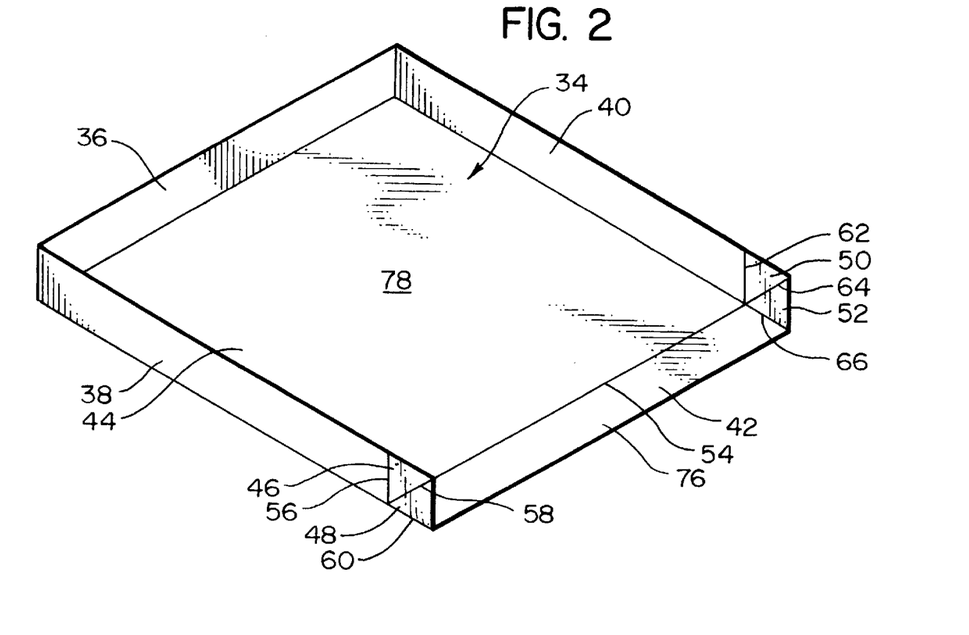
FIG. 2 is a perspective view showing a fluid containment device of the system shown in FIG. 1 in its installation configuration.

The containment device 22 is shown in FIG. 2 in its installation configuration. In FIG. 1, the device 22 is shown in its operational configuration.

In the operation configuration, the device 22 defines a rectangular sump region that is closed on five sides. In the installation configuration, the sump region 34 is enclosed on only four sides. In particular, the sump region is open at top and along a front side thereof when the fluid containment device 22 is in its installation configuration and is open only on its top side when in the operational configuration.

More specifically, the fluid containment device 22 comprises, in one form, an integral body having a back panel 36, a left side panel 38, a right side panel 40, a front panel 42, a bottom panel 44, first and second left corner panels 46 and 48, and first and second right corner panels 50 and 52. In the exemplary device 22, the back, left, and right panels 36–40 are integrally formed with the bottom panel 44 such that they extend upwardly therefrom at a right angle. The front panel 42 is integrally formed with the bottom panel 44, but is connected thereto by a living hinge 54. The first left corner panel 46 is attached to the left side panel 38 by a living hinge 56 and to the second left corner panel 48 by a living hinge 58. The second left corner panel 48 is also attached to the front panel 42 by a living hinge 60. Similarly, the first right corner panel 50 is attached to the right side panel 40 by a living hinge 62 and to the second right corner panel 52 by a living hinge 64. Like the second left corner panel 48, the second right corner panel 52 is attached to the front panel 42 by a living hinge 66.

Accordingly, while the back, left, and right side panels 36–38 do not, under normal circumstances, change their orientation with respect to the bottom panel 34, the living hinges allow the front side panel 42 to rotate between first and second angular positions as shown in FIG. 1 and 2. In FIG. 2 the front side panel 42 is substantially coplanar (~0°) with the bottom panel 44, while in FIG. 1 the front side panel 42 extends at a substantially right angle (~90°) from the bottom panel 44.

Figure 3:
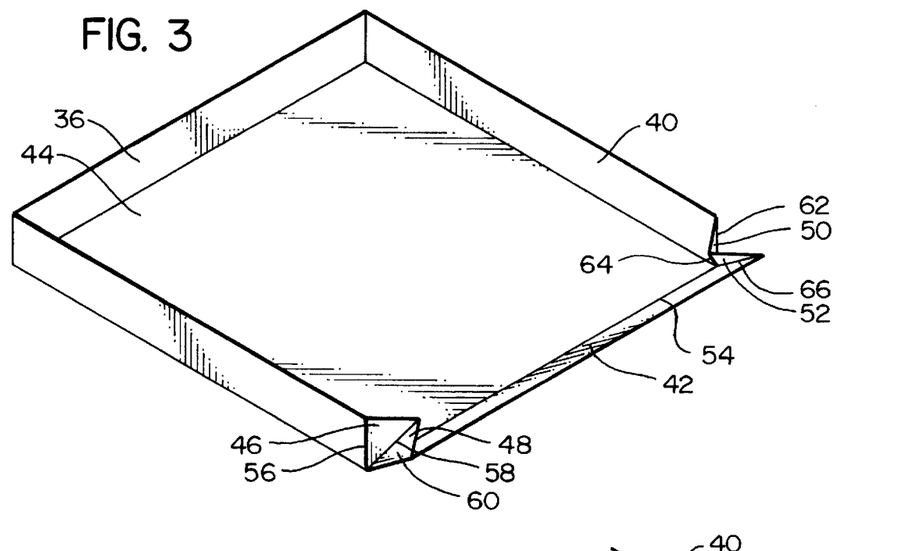
FIGS. 3–5 depict the method of converting the fluid containment device shown in FIGS. 1–2 from its installation configuration into its operational configuration.
Figure 4:
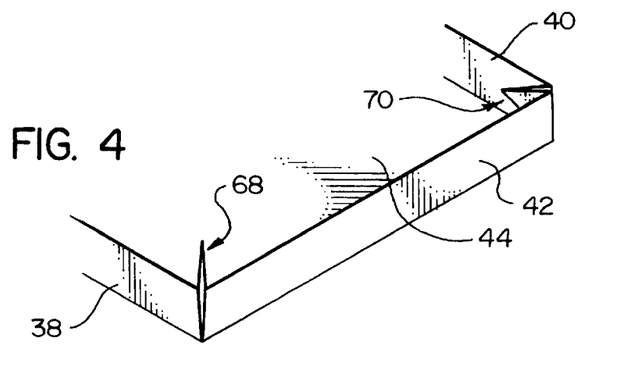

The process of moving the front side panel 42 between the first and second angular positions is shown in FIGS. 3–4. In FIG. 3, the front side panel 42 is in an intermediate position in which the angle between the front side panel 42 and the bottom panel 44 is between 0° and 90°. As shown, the living hinges 56–60 and 62–66 allow the left corner panels 46 and 48 to fold inwardly as the front side panel 42 rotates upwardly about an axis defined by the living hinge 54. Similarly, the living hinges 62–66 allow the right corner panels 50 and 52 to fold inward as the front side panel 42 is rotated between its first and second angular positions.

Figure 5:
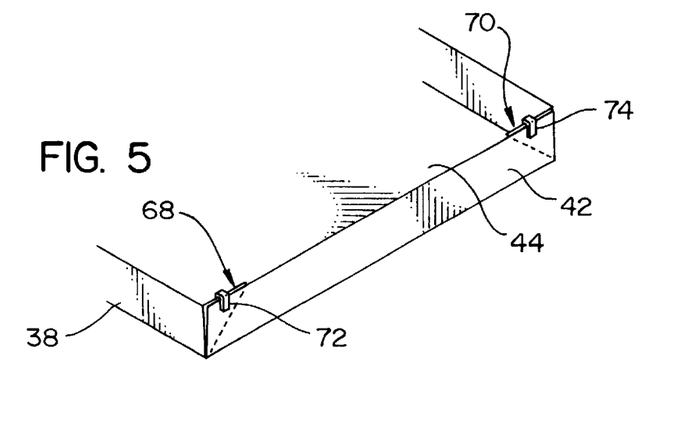

When the front side panel 42 extends at approximately a right angle relative to the bottom panel 44, folds 68 and 70 comprising the panels 46 and 48 and 50 and 52, respectively, point inwardly towards the sump region 34. To prevent these folds 68 and 70 from interfering with the dishwasher 24 and make sure that the fluid containment device 22 stays in its operational configuration and is thus watertight on five sides, these folds 68 and 70 are clipped, as shown in FIG. 5, to the front panel 42 using clips 72 and 74. These clips 72 and 74 are, in the exemplary containment device 22, separate U-shaped pieces made out of a flexible, resilient material such as plastic or metal that exert pressure on the folds 68 and 70 to hold these folds against the front panel 42. In an alternative embodiment, straps, connectors, or the like may be integrally formed with the fluid containment device 22 to hold the folds 68 and 70 against the front panel 42.

A similar effect may be had by clipping the folds 68 and 70 against the side panel 38 or 40 adjacent thereto, but this may be difficult to accomplish after the dishwasher has been installed on top of the bottom panel 44.

The significance of having the fluid containment device change between its installation configuration and its operation configuration is that, especially in the case of a dishwasher, there is often not enough room in the cavity 32 to lift the dishwasher 24 over the front side panel 42 when it is in its operational configuration. Accordingly, the conventional process of installing the dishwasher 24 is modified as follows in order to accommodate the fluid containment device 22 of the present invention.

Before the dishwasher 24 is moved into place adjacent to the cavity 32, the fluid containment device 22 is inserted into the cavity 32 such that its bottom panel 44 is in contact with the flooring material and its back panel 36 is adjacent to the wall defining the back side of the cavity 32. The fluid containment device is put into its installation configuration, in which the front side panel 42 is in its first angular position (substantially coplanar with the bottom panel 44).

The dishwasher 24 is then placed adjacent to the cavity 32 and the appropriate water supply and drain hoses connected thereto in the conventional manner. The dishwasher 24 is then rolled or slid into the cavity 32 over an inner surface 76 of the front side panel 42 and onto an upper surface 78 of the bottom panel. The front side panel 42 is then moved from the first angular position shown in FIG. 2 to the second angular position shown in FIGS. 1, 4, and 5. The clips 72 and 74 are then put in place to lock the folds 68 and 70 against the front panel 42. At this point, the sump region 34 is enclosed on five sides. This allows water to trickle down into this region 34, but prevents water from flowing in any direction out of the sump region 34, unless of course this water exceeds the volume defined by this region 34. The sump region 34 is thus sized and dimensioned to ensure that it can handle a sufficient volume of water to cover most circumstances in which water leaks or overflows from the dishwasher 24.

Referring now to FIG. 5, depicted therein is yet another exemplary fluid containment system 120 constructed in accordance with, and embodying, the principles of the present invention. The fluid containment system 120 comprises a fluid containment device 122 constructed in exactly the same manner as the device 22 described above. The device 122 will thus not be described herein in further detail except to state that it defines a sump region 124.

The system 120 is designed to collect water and other material that leaks from a dishwasher 126 mounted within cabinets 128 and 130 and underneath a countertop 132.

In addition to the fluid containment device 122, the fluid containment system 120 comprises a sensor 136 and a warning light 138. The warning light 138 is connected to the sensor 136 by a wire 140 such that, when the sensor 136 detects water within the sump region 124, the sensor 136 causes the light 138 to illuminate to advise of the leak or overflow that has occurred to cause water to flow into the sump region 124. The sensor 136, wire 140, and light 138 form a warning means for warning of the presence of water within the sump region 124. The warning light 138 may be incorporated into the front panel of the dishwasher.

Figure 7:
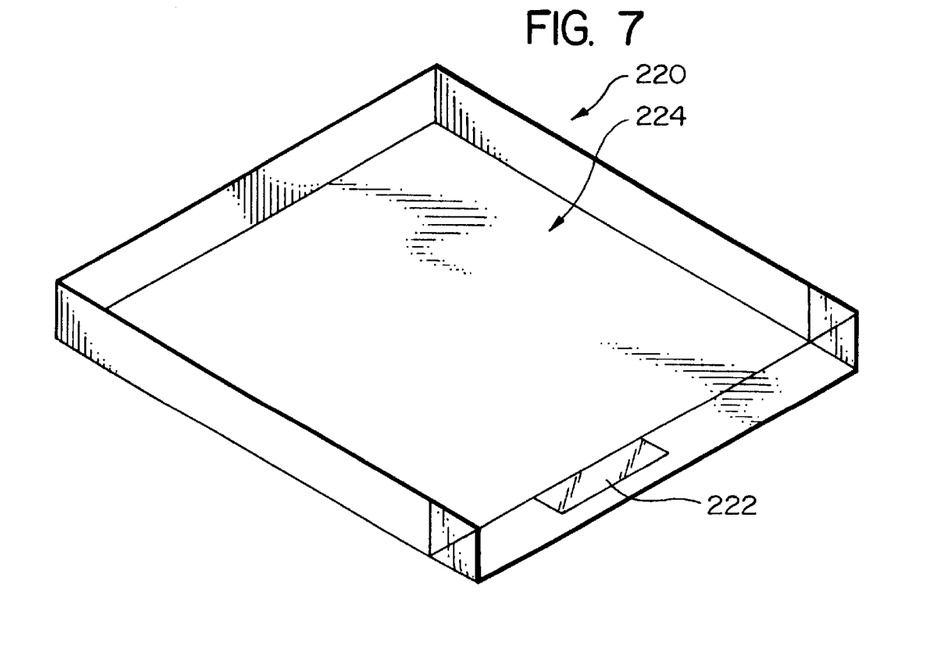
FIG. 7 is a perspective view of a fluid containment device of a third embodiment to the present invention having a transparent portion for viewing the interior of the device.
Figures 8, 9:
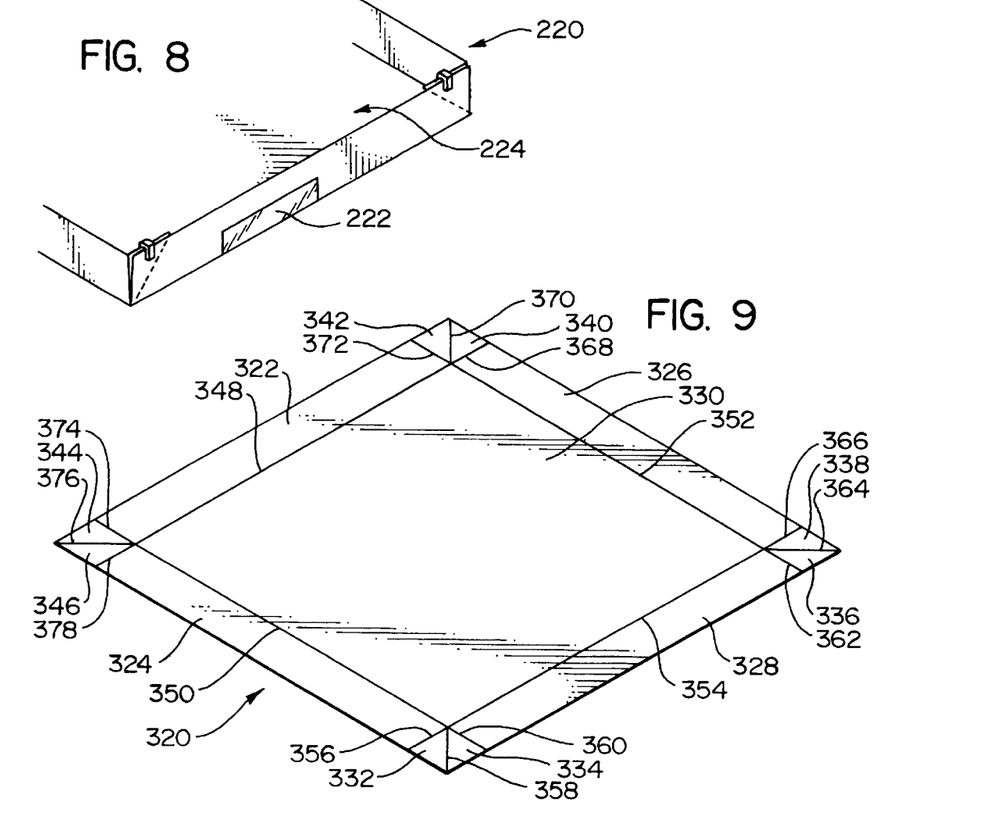
FIG. 8 is a perspective view showing the device in FIG. 7 in its operational configuration.
FIG. 9 is a perspective view showing yet another embodiment of a fluid containment device of the present invention in its shipping configuration.

Referring now to FIG. 7, depicted therein is yet another exemplary fluid containment device 220. This device 220 is constructed in the same basic manner as the devices 22 and 122 described above, but it comprises a window portion 222. The window portion 222 is made out of substantially transparent material that allows visual inspection of the sump region 224 defined by the fluid containment device 220. As shown in FIG. 8, when the fluid containment device 220 is in its operation configuration, the window portion allows one to visually inspect the sump region 224 to determine whether any water is present therein. In this context, the window region 222 may be used in place of or in conjunction with a warning means such as that formed by the sensor 136, light 138, and wire 140 of the system 120. An alternative to making a discrete portion of the device 22 transparent would be to make the entire device 22 out of substantially transparent material.

Referring now to FIGS. 8–9, depicted therein is yet another exemplary fluid containment device 320 constructed in accordance with, and embodying, the principles of the present invention. The device 320 is in its shipping configuration in FIG. 8 and in its operational configuration in FIG. 9.

The device 320 is similar in certain respects to the device 22 described above. The device 320 has three configurations rather than the two in which the device 22 can exist. First, the device 320 can be in a shipping configuration as shown in FIG. 8 in which it is essentially a flat piece of plastic material. The device 320 can also be in an installation configuration (not shown) in which its sup region is enclosed on four sides; the installation configuration of the device 320 is very similar to that of the installation configuration of the device 22 shown in FIG. 2. Finally, after it has been installed under an appliance, the device 320 is put into its operational configuration as shown in FIG. 9.

More specifically, the device 320 starts out in its shipping configuration in which all of the panels thereof are substantially coplanar. As shown in FIG. 8, the device 320 has a back panel 322, a left side panel 324, a right side panel 326, a front panel 328, a bottom panel 330, first and second front left corner panels 332 and 334, first and second right front corner panels 336 and 338, first and second right rear panels 340 and 342, and first and second left rear panels 344 and 346.

These panels 322–346 are connected by the following living hinges: a hinge 348 between the back panel 322 and the bottom panel 330; a hinge 350 between the left side panel 324 and the bottom panel 330; a hinge 352 between the right side panel 326 and bottom panel 330; a hinge 354 between the front side panel 328 and the bottom panel 330; a front left corner/side hinge 356 between the left side panel 324 and the first front left corner panel 332; a front left corner hinge 358 between the first and second front left corner panels 332 and 334; a front left corner/side hinge 360 between the second left front corner panel 334 and the front panel 328; a front right corner/side hinge 362 between the front panel 328 and the first right corner panel 336; a front right corner hinge 364 between the first and second front right corner panels 336 and 338; a front right corner/side hinge 366 between the second right front corner panel 338 and the right side panel 326; a back right corner/side hinge 368 between the right side panel 326 and the first right back corner panel 340; a back right corner hinge 370 between the first and second back right corner panels 340 and 342; a back right corner/side hinge 372 between the second back right corner panel 342 and the back panel 322; a back left corner/side hinge 374 between the back panel 322 and the first back left corner panel 344; a back left corner hinge 376 between the first and second back left corner panels 344 and 346; and a back left corner/side hinge 378 between the second back left corner panel 346 and the left side panel 324.

These panels 322–346 and living hinges 348–378 allow the fluid containment device 320 to be shipped in a flat configuration and subsequently folded in a manner substantially same as that described with reference to FIGS. 3–5 into an installation configuration in which the device 320 may be installed underneath an appliance as described above; the device 320 may then be converted into an operational configuration following the same steps shown in FIGS. 3–5.

Figure 10:
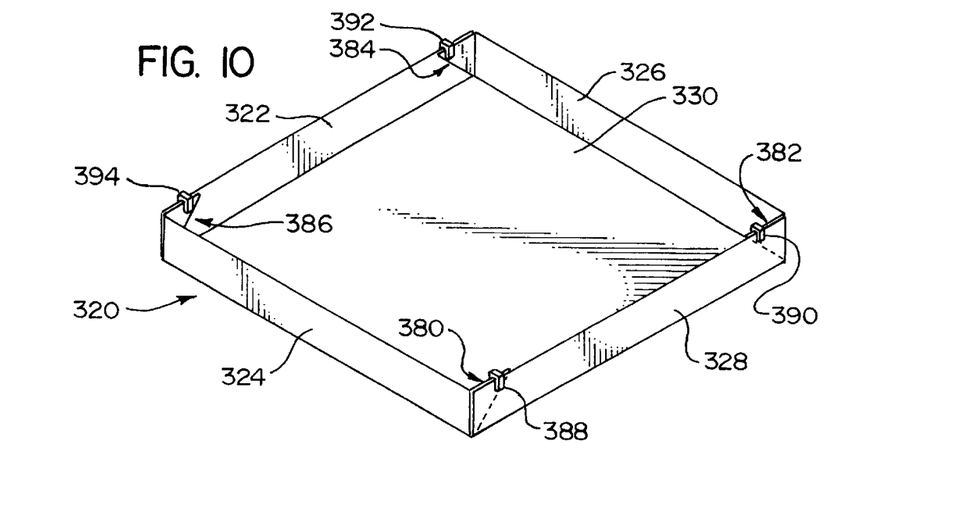
FIG. 10 shows the device shown in FIG. 9 in its operational configuration.

FIG. 10 shows the fluid containment device 320 in its operational configuration with first through fourth folds 380–386 held in place against the front and back panels 328 and 322 by clips 388–394, respectively.

It should be clear that the device shown in FIGS. 9–10 may be modified with the transparent panel 322 of the device 320 or the warning means comprising the sensor 136, light 138, and wire 140 of the system 120.

Figure 6:
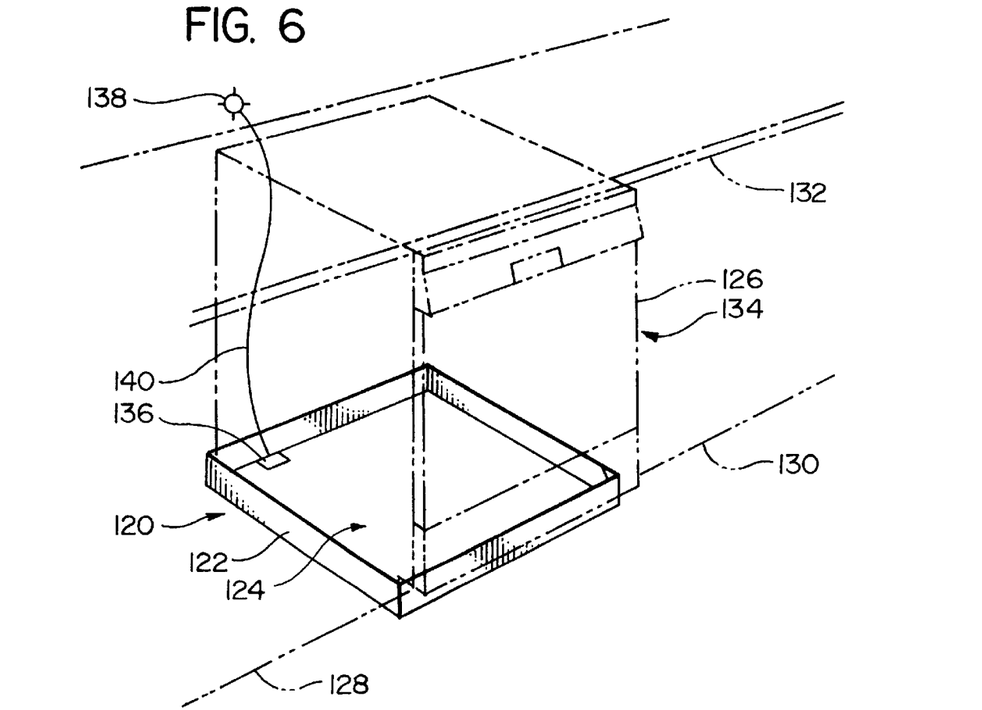
FIG. 6 shows yet another exemplary embodiment of a fluid containment system of the present invention including warning means for indicating when water is being contained by the fluid containment system.

The device shown in FIGS. 1–5 would require the least amount of steps during installation but would perhaps not be as easy to ship as the device shown in FIGS. 9–10. The system 120 shown in FIG. 6 would be the most expensive to manufacture and install but would provide the highest level of integrity against leaks and overflows. The device shown in FIGS. 9–10 would probably be the least expensive to manufacture and ship, but would require the most steps during installation, especially if equipped with a warning system such as that shown in FIG. 6.

To allow the fluid containment device 22 described in FIGS. 1–5 to be stored and shipped with minimal costs, the device 22 may be made such that its left and right side panels 38 and 40 diverge slightly outwardly (~95° to 100°) from the back panel 36 towards the front panel 42. This would allow a number of devices 22 to be stacked one within the other when in the installation configuration to facilitate shipping and storage.

Figure 11:
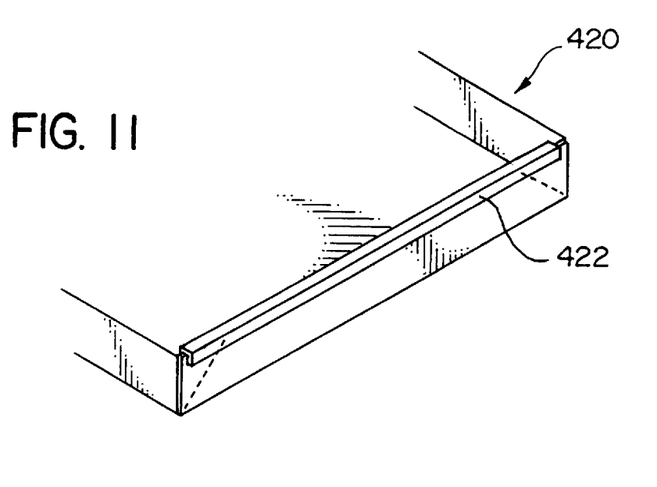
FIG. 11 is a partial perspective view depicting an alternative clip that may be used to maintain the foregoing fluid containment devices in their operational configuration.

Referring now to FIG. 11, depicted at 420 therein is another exemplary device constructed in accordance with the principles of the present invention. This device 420 is or may be same as either of the devices 22 and 120 described above. The device 420 differs in that it comprises a long clip 422 that is used in place of the clips 70 and 72 and 388–394 described above. The device 420 is less likely to be dislodged and rigidifies the front of the device 420 when it is in its installation configuration as shown in FIG. 11.

The present invention may be embodied in other specific forms without departing from the essential characteristics thereof. The present embodiments are therefore to be considered in all respects as illustrative and not restrictive.

I claim:

1. A fluid containment system for appliances comprising:
   a fluid containing member having a bottom panel and first, second, third, and fourth side panels, where the fourth side panel is connected to the first side panel by a first pair of corner panels and to the second side panel by a second pair of corner panels; wherein
   the fluid containing member is reconfigurable among a plurality of configurations, including
      a first configuration in which the first, second, and third side panels extend at an angle with respect to the bottom panel and the fourth side panel is substantially co-planar with the bottom panel, and
      a second configuration in which the first, second, third, and fourth panels extend at an angle with respect to the bottom panel to define a sump region that is enclosed on five sides; whereby
   the fluid containing member is in its first configuration to allow the appliance to be placed onto the bottom panel;
   the fluid containing member is in its second configuration when the appliance is operated,
   when the fluid containing member is in its first configuration, the corner panels are substantially coplanar; and
   when the fluid containing member is in its second configuration, the corner panels form folds.

2. A fluid containment system as recited in claim 1, in which the plurality of configurations among which the fluid containing member is reconfigurable includes a third configuration in which the side panels are all substantially coplanar with the bottom panel.

3. A fluid containment system as recited in claim 1, further comprising retaining means for maintaining the fluid containing member in the second configuration.

4. A fluid containment system as recited in claim 1, further comprising retaining means for maintaining the fluid containing member in the first configuration.

5. A fluid containment system as recited in claim 1, in which the fluid containing member further comprises a hinge means for attaching the fourth side panel to the bottom panel.

6. A fluid containment system as recited in claim 5, in which the fluid containing member is comprised of plastic material and the hinge means is a living hinge.

7. A fluid containment system as recited in claim 1, further comprising retaining means for attaching the folds formed by the corner panels to at least one of the side panels to maintain the fluid containing member in its second configuration.

8. A fluid containment system as recited in claim 7, in which the retaining means comprises at least one clip that holds the folds against the fourth side panel.

9. A fluid containment system as recited in claim 1, further comprising indicating means for indicating the presence of water within the sump region.

10. A fluid containment system as recited in claim 9, in which the system comprises at least one indicating means of a group of indicating means comprising a transparent portion of the fourth panel and a sensor for indicating the presence of water.

11. A method of containing fluid leaking from appliances, comprising the steps of:
   providing a fluid containment member defining a bottom panel and first, second, third, and fourth side panels, where the fourth side panel is connected to the first side panel by a first pair of corner panels and to the second side panel by a second pair of corner panels;
   first configuring the fluid containment member such that the first, second, and third side panels extend at an angle with respect to the bottom panel to define a sump region, the first and second pairs of corner panels are substantially coplanar and extend at an angle with respect to the bottom panel, and the fourth side panel is substantially coplanar with the bottom panel;
   arranging the fluid containment member at a location at which the appliance is to be installed;
   placing the appliance onto the bottom panel of the fluid containment member; and
   second configuring the fluid containment member such that the fourth panel extends at an angle with respect to the bottom panel and the corner panels form folds; whereby
   with the fourth panel extending at an angle with respect to the bottom panel, the sump region is closed on first, second, third, fourth, and fifth sides and open on a sixth side, whereby fluid from the appliance flows into the sump region through the sixth side but cannot flow out of the sump region through the first through fifth sides.

12. A method as recited in claim 11, in which the step of first configuring the fluid containment member comprises the steps of:
   providing the fluid containment member such that the side panels are substantially coplanar with the bottom panel; and
   manipulating the fluid containment member such that the first, second, and third side panels extend at an angle with respect to the bottom panel.

13. A method as recited in claim 11, further comprising the step of providing an indicator assembly to indicate the presence of water within the sump region.

14. A method as recited in claim 11, further comprising the step of forming at least a portion of the fluid containment member out of transparent material to allow the sump region to be viewed through the fourth side panel.

15. A fluid containment system for appliances comprising:
   a fluid containing member comprising a bottom panel, first, second, third, and fourth side panels, and first, second, third, and fourth pairs of corner panels; wherein
   the fourth side panel is connected to the bottom panel and to the corner panels by living hinges that allow the fourth side panel to rotate relative to the bottom panel between a first position in which the fourth side panel is substantially coplanar with the bottom panel and a second position in which the fourth side panel extends at an angle relative to the bottom panel;
   the fluid containing member is reconfigurable among a plurality of configurations, including
      first configuration in which the first, second, and third side panels extend at an angle with respect to the bottom panel and the fourth side panel is in its first position, and a second configuration in which the first, second, third panels extend at an angle with respect to the bottom panel and the fourth side panel is in its second position to define a sump region that is enclosed on five sides; whereby the fluid containing member is in its first configuration when the appliance is placed onto the bottom panel;

the fluid containing member is in its second configuration when the appliance is operated; and the side panels are connected to the corner panels and to the bottom panel by living hinges to allow the side panels to rotate relative to the bottom panel such that the fluid containment member may be reconfigured among its plurality of configurations.

16. A fluid containment system as recited in claim 15, in which the plurality of configurations among which the fluid containing member is reconfigurable includes a third configuration in which the side panels are all substantially coplanar with the bottom panel.

17. A fluid containment system as recited in claim 15, further comprising first retaining means for maintaining the fluid containing member in the second configuration.

18. A fluid containment system as recited in claim 17, further comprising second retaining means for maintaining the fluid containing member in the first configuration.

* * * * *